(12) United States Patent
Shahin et al.

(10) Patent No.: US 12,203,515 B2
(45) Date of Patent: Jan. 21, 2025

(54) BRAKE PAD ASSEMBLY HAVING A SHIM FOR A DISK BRAKE SYSTEM AND DISK BRAKE SYSTEM

(71) Applicant: HL MANDO CORPORATION, Pyeongtaek (KR)

(72) Inventors: Hatem Shahin, Pfaffenhofen (DE); Lothar Wagner, Simmern (DE); Kai Braun, Friedrichsdorf (DE)

(73) Assignee: HL MANDO CORPORATION, Pyeongtaek (KR)

( * ) Notice: Subject to any disclaimer, the term of this patent is extended or adjusted under 35 U.S.C. 154(b) by 320 days.

(21) Appl. No.: 17/750,480

(22) Filed: May 23, 2022

(65) Prior Publication Data
US 2023/0228306 A1    Jul. 20, 2023

(51) Int. Cl.
*F16D 65/097*    (2006.01)
(52) U.S. Cl.
CPC ................... *F16D 65/097* (2013.01)
(58) Field of Classification Search
CPC ............. F16D 65/0977; F16D 65/0972; F16D 65/0978; F16D 65/0979; F16D 65/0975; F16D 65/0006; F16D 65/097; F16D 65/0976; F16D 55/224; F16D 65/0018; F16D 55/02; F16D 65/122; B62L 1/005
See application file for complete search history.

(56) References Cited

U.S. PATENT DOCUMENTS

| | | | |
|---|---|---|---|
| 2002/0189910 A1* | 12/2002 | Yano | B32B 15/043 188/264 G |
| 2014/0374202 A1 | 12/2014 | Mahoudeaux | |
| 2021/0309928 A1 | 10/2021 | Afaneh | |

FOREIGN PATENT DOCUMENTS

| | | |
|---|---|---|
| DE | 3333670 A1 | 4/1985 |
| DE | 602004009485 T2 | 8/2008 |
| JP | H07280005 A | 10/1995 |
| JP | 2011017371 A | 1/2011 |
| JP | 2015068432 A | 4/2015 |
| KR | 200186765 Y1 | 6/2000 |
| KR | 101591746 B1 | 2/2016 |

OTHER PUBLICATIONS

KR 20110125281 A (Year: 2011).*
Jp S61166240 U (Year: 1986).*
FR 2921136 A1 (Year: 2009).*
WO 2020255969 A1 (Year: 2020).*
DE OA dated Dec. 15, 2022.

* cited by examiner

*Primary Examiner* — Robert A. Siconolfi
*Assistant Examiner* — Mahbubur Rashid
(74) *Attorney, Agent, or Firm* — Harvest IP Law, LLP

(57) ABSTRACT

The application relates to a brake pad assembly (10) for a disk brake system and to a disk brake system. The proposed brake pad assembly (10) comprises a back plate (5) having a front side (4) for facing a brake disk (1) of the disk brake system and a friction layer (3) arranged on the front side (4) of the back plate (5) for contacting a friction surface of the brake disk (1). The back plate (5) comprises a guiding protrusion (9) configured to be slidably received within a guiding recess (18) of a carrier (19) of the disk brake system. The brake pad assembly (10) further comprises a shim (16) configured to be arranged between the guiding protrusion (18) of the back plate (5) and the guiding recess (18) of the carrier (19). The shim (16) comprises a rubber layer (23) and a stiff layer (22).

13 Claims, 4 Drawing Sheets

BRAKE PAD ASSEMBLY HAVING A SHIM FOR A DISK BRAKE SYSTEM AND DISK BRAKE SYSTEM

Figure 1:
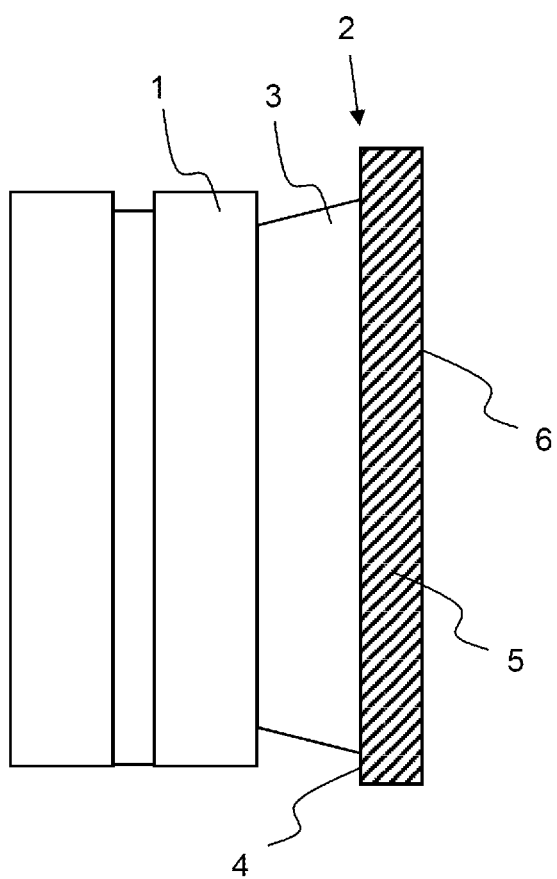

The application relates to a brake pad assembly for a disk brake system and to a disk brake system. The brake pad assembly has a shim.

Brake Engineers are in search for robust solutions to suppress squeal noises (tonal loud noises typically appearing in frequencies between 1000 and 16000 Hz) in disk brake systems. Different solutions are known to improve the noise, vibration, and harshness (NVH) characteristics, including a steel shim glued to a back side of a back plate of a brake pad assembly, different chamfers on a pad of the brake pad assembly, slots on pad surfaces contacting the disk, modifications of friction material of the brake pads, an underlayer connecting the friction material to the back plate, and additional massive bodies on certain components like a carrier or the housing. The main effect of the shim is to decouple system modes from each other. While these solutions can help improve the squeal noise characteristics, in most cases these solutions work well only under specific braking conditions (low or high frequency, cold or warm temperature). Prior art can be found, e.g., in document DE 197 06 122 A1.

In view of the above-mentioned aspects, it is an object of the present invention to provide an improved brake pad assembly for a disk brake system. In particular, it is an object of the application to provide a compact and robust brake pad assembly with a low mass at a low cost, which reliably suppresses noise, in particular squeal noise. In addition, it is an object of the application to provide an improved disk brake system having these advantages.

This objective is achieved by a brake pad assembly for a disk brake system comprising the features of claim 1 and by a disk brake system having the features of another claim. Optional further features and further developments will become apparent from the dependent claims and the detailed description in conjunction with the accompanying figures.

The proposed brake pad assembly for a disk brake system comprises a back plate having a front side for facing a brake disk of the disk brake system and a friction layer arranged on the front side of the back plate for contacting a friction surface of the brake disk. The back plate comprises a guiding protrusion configured to be slidably received within a guiding recess of a carrier of the disk brake system. The guiding protrusion may be an ear portion of the back plate. The guiding recess of the carrier may be a guiding groove. The brake pad assembly further comprises a shim configured to be arranged between the guiding protrusion of the back plate and the guiding recess of the carrier. The shim comprises a rubber layer and a stiff layer.

The proposed brake pad assembly may improve the noise dampening characteristics of the disk brake system. In general, squeal noises and clicking noises (resulting from backwards braking) may be suppressed. The shim decouples vibrational modes in the area of the guiding protrusion of the back plate. In some embodiments, the shim is configured to prevent direct contact between the back plate and the carrier. The shim may also have a positive effect on the corrosion behavior. In addition, the shim can further improve an ease of movement of the back plate relative to the carrier. Further, the shim may provide support and/or abutment in tangential and radial directions and may achieve a well-defined fit of the brake pad assembly within the guiding recess of the carrier. Thereby, an unwanted movement and/or rotation of the brake pad assembly may be prevented. The present invention may avoid relative radial and tangential motion of the brake pad assembly with respect to the carrier and may enable a well-defined contact area between the brake pad assembly and the carrier. By arranging the shim between the guiding protrusion and the carrier, the noise generation can be efficiently avoided by avoiding uncontrolled and undefined relative motion between components in the area that is important for the noise characteristics, because the region of the guiding protrusion is highly relevant for transmission of forces such as brake torque between the brake pad assembly and the carrier. The rubber layer and stiff layer of the shim enable efficient decoupling of tangential and radial vibrational modes in the area of the guiding protrusion and prevent interaction of vibration between the brake pad assembly and the carrier. Hence, the present invention enables a compact and robust brake pad assembly having only few components and a low mass, which reliably suppresses noise, in particular squeal noise.

The application further relates to the disk brake system. The disk brake system may comprise a brake pad assembly as described above or below. The disk brake system may further comprise the carrier. The brake pad assembly may be configured to slide with respect to the carrier. The brake pad assembly may be configured to slide with respect to the carrier in an axial direction upon brake application. The shim typically moves in the axial direction together with the back plate upon application of the brake. The axial direction may be parallel to an axis of rotation of a brake disk. In most embodiments, the disk brake system is a floating caliper brake. The disk brake system may comprise a brake piston and/or a caliper finger. The brake piston or caliper finger may be configured to push against a back side of the brake pad assembly to push the friction layer of the brake pad assembly against the friction surface of the brake disk. The back side of the brake pad assembly may be formed by a back surface of the back plate.

In typical embodiments, the rubber layer is arranged between the stiff layer and the guiding protrusion of the back plate. Further, a thickness of the rubber layer may be at least 0.1 mm and/or at most 0.4 mm, for example 0.2 mm or 0.25 mm. In this manner, decoupling of vibrational modes may be further improved and noise may be further reduced in realistic braking scenarios.

In typical embodiments, the shim covers the back plate in a region of a surface of the guiding protrusion of the back plate. The surface of the guiding protrusion may face the guiding recess of the carrier. The surface of the guiding protrusion may be oriented such that axial directions lie within the surface. The surface of the guiding protrusion may be oriented essentially perpendicular to the friction surface of the brake disk. In most embodiments, the surface of the guiding protrusion is not a back surface or a front surface of the guiding protrusion. The back and front surfaces of the guiding protrusion typically delimit the guiding protrusion in positive and negative axial directions. The surface of the guiding protrusion of the back plate may be a side surface, a top surface or a bottom surface of the guiding protrusion of the back plate. The side surface of the guiding protrusion typically delimits the guiding protrusion in a tangential direction. The top surface of the guiding protrusion typically delimits the guiding protrusion in a positive radial direction. The bottom surface of the guiding protrusion typically delimits the guiding protrusion in a negative radial direction. Thereby, relative motion between the carrier and the brake pad assembly in the radial direction and/or in the tangential direction may be reduced, and the vibrational coupling between the brake pad assembly and the carrier in these directions may be dampened. For example, by arranging the shim such that it covers the side surface of the guiding protrusion, relative motion in the direction that is most important for brake torque transmission in realistic braking scenarios, i.e., in the tangential direction, may be efficiently controlled. Further, mode decoupling may be achieved in this direction. In some embodiments, the shim has a C-shape. The shim may cover the side surface, the top surface and the bottom surface of the guiding protrusion of the back plate. In this way, relative motion between components may be efficiently reduced in the radial and tangential directions and mode decoupling may be achieved in these directions for improved noise reduction.

In most embodiments, the shim is in direct contact with the back plate, in particular with the surface of the guiding protrusion of the back plate. In some embodiments, the shim lies flat against the surface of the guiding protrusion of the back plate. There may be essentially no gap between the shim and the surface of the guiding protrusion. In case there is a gap, a maximal width of the gap typically amounts to at most 0.5 mm. By ensuring that the shim lies flat against the surface, efficient mode decoupling is enabled. Further, even minor relative motion between the shim and the back plate is avoided and therefore uncontrollable noise is prevented.

In most embodiments, the shim is attached to the surface of the guiding protrusion of the back plate. The surface of the guiding protrusion of the back plate may be the side surface, the top surface or the bottom surface of the guiding protrusion of the back plate. By attaching the shim to the surface of the guiding protrusion of the back plate, a tight and flat connection between back plate and surface may be ensured for reliable noise reduction. The shim may be movable in the axial direction together with back plate as a unit. The shim may be attached to the guiding protrusion of the back plate in a manner that does not allow any gap or clearance or relative motion between both components. It has been found that one reason for brake noises, especially squeal noises, in known disk brake systems is the relative motion between components which contact each other. Relative motion and squeal noise generation may occur during braking or after braking when releasing the brake force, therefore squeal can arise during or after braking. Hence, a dynamic behavior of the disk brake system may be further improved and noise may be further dampened by attaching the shim to the surface of the guiding protrusion of the back plate.

In some embodiments, the shim is attached to the guiding protrusion of the back plate using an adhesive layer. By using the adhesive layer, the dynamic interface properties between the shim and the back plate can be further improved. In this way, generation of noise generation may be further reduced. The adhesive layer may be arranged between the guiding protrusion and the rubber layer. The adhesive layer may be in direct contact with the guiding protrusion and/or the rubber layer. In most embodiments, a thickness of the adhesive layer is at least 0.05 mm and/or at most 0.1 mm. For example, the thickness of the adhesive layer may be 0.08 mm. In this way, the mode decoupling properties of the shim may be further enhanced.

In some embodiments, the shim comprises another rubber layer covering an outer surface of the stiff layer. The other rubber layer may be in direct contact with the outer surface of the stiff layer. Typically, the other rubber layer is thinner than the rubber layer. A thickness of the other rubber layer may be less than 0.1 mm, for example 0.05 mm. Due to the other rubber layer, the dynamic characteristics can be further improved and noise generation can be further reduced.

In some embodiments, the shim is attached to the guiding protrusion of the back plate using bolts and/or rivets. Further the shim may be attached to the guiding protrusion of the back plate using a means of fixation, wherein the means of fixation includes recesses within the guiding protrusion of the back plate. The bolts or rivets may be received within the recesses. The bolts or rivets may be recessed with respect to an outer surface of the shim. In particular, the bolts or rivets may be countersunk or counterbored. In this manner, the bolts or rivets may not extend all the way toward the outer surface of the shim. In this way, the sliding characteristics of the brake pad assembly within the carrier may be further improved and noise generation may be further reduced. In some embodiments, the shim is attached to the guiding protrusion of the back plate using at least two, in particular at least three, bolts or rivets. In this way, a flat and tight contact between the guiding protrusion and the shim is further improved and noise generation is further reduced.

The shim may have a uniform thickness. An inner surface of the shim may be formed by an inner surface of the rubber layer. The inner surface of the rubber layer may lie flat against the surface of guiding protrusion of back plate. The shim may have no intermediate layer between the stiff layer and the rubber layer. Further, apart from the adhesive layer, if provided, there may be no intermediate layer between the shim and the guiding protrusion of the back plate. Further, apart from the adhesive, rivets or bolts, if provided, there may be only the shim arranged between the back plate and the carrier. The shim may be bent. In most embodiments, the shim is not folded. The shim may comprise no sharp bends or kinks that have a bending angle of more than 120 degrees. Typically, the shim has a thickness of at least 0.3 mm and/or at most 1.1 mm. The shim may be made from a flat body. The shim may be ribbon-shaped. The shim may have a C-shape. The shim may be bent in at least one or in at most two regions. A radius of curvature in the bent region or bent regions may be at least 45 degrees, e.g., at least 70 degrees, and/or at most 110 degrees. The bent region or bent regions may be bent with a bending axis being parallel to the axial direction. In particular, the shim may cover the top surface and the bottom surface and the side surface of the guiding protrusion of the back plate. Typically, the shim is formed from a straight ribbon-shaped part by bending sections of the straight ribbon-shaped part. A width of the shim, e.g., a ribbon width, may be at least 3 mm and/or at most 8 mm, for example 5 mm, in particular as measured in the axial direction. A length of the shim as measured along a curved path of the shim, e.g., corresponding to an overall length of the ribbon in an un-curved straight state, may be at least 7 mm. In most embodiments, a length of the shim as measured along a curved path of the shim, e.g., corresponding to an overall length of the ribbon in an un-curved straight state, may be at most 60 mm, in particular at most 40 mm.

An outer surface may be configured to come into direct contact with the carrier. In some embodiments, the shim comprises a non-stick coating layer forming an outer surface of the shim. The non-stick coating layer may be a PTFE layer. In this way, the dynamic properties may be further improved when the brake is applied and noise may be further reduced.

The stiff layer may be stiffer than the rubber layer. A thickness of stiff layer may be at least 0.2 mm and/or at most 0.8 mm. In some embodiments, the stiff layer is a metal sheet. In this way, the shim may be beneficial with regard to thermal stability and durability. In this embodiment, a thickness of the stiff layer may typically be at least 0.2 mm and/or at most 0.5 mm, e.g., 0.4 mm. In other embodiments, the stiff layer is a hard plastic sheet. In this way, damping provided by the shim may be increased. In this embodiment, a thickness of the stiff layer may typically be at least 0.4 mm and/or at most 0.8 mm, e.g., 0.6 mm.

To further improve the noise dampening properties of the shim, a metal layer and a hard plastic layer may be used. For example, the stiff layer may be the metal sheet, and the shim may further comprise a hard plastic sheet. In this way, improved beneficial noise damping properties may be achieved. For example, a thickness of the metal sheet may be at least 0.2 mm and/or at most 0.3 mm. A thickness of the hard plastic sheet may be at least 0.3 mm and/or at most 0.5 mm. The metal sheet may cover an outer surface of the hard plastic sheet. The metal sheet may be in direct contact with the hard plastic sheet. In this manner, the noise characteristics may be further improved.

A width of a gap between an outer surface of the shim and the guiding recess of the carrier may be at least 0.6 mm and/or at most 1.2 mm, for example 0.8 mm, in particular when the brake is not applied. The shim may be configured come into direct contact with the carrier upon application of the brake.

In typical embodiments, the back plate comprises a back plate body. The guiding protrusion of the back plate may protrude in a tangential direction from the back plate body. In this manner, the guiding protrusion may extend in a sideward direction and may define a leading or a trailing portion of the back plate or a part thereof. The back plate may comprise another guiding protrusion. Another shim may be arranged between the other guiding protrusion of the back plate and the carrier. The other shim may have any or all of the features of the shim described above or below. The guiding protrusion may define a leading portion of the back plate, and the other guiding protrusion may define a trailing portion of the back plate. The shim arranged between the guiding protrusion of the carrier and the other shim arranged between the other guiding protrusion and the carrier may differ in size and/or shape, according to some embodiments.

In typical embodiments, the back plate is formed as a single part, for example as a non-joined and/or monolithic part. A thickness of the back plate and/or the guiding protrusion of the back plate may be at least 3 mm and/or at most 8 mm, for example 5 mm, in particular as measured in the axial direction. The back plate and/or the guiding protrusion of the back plate typically comprises steel, phenolic resin, aluminium, hard plastic, or cast iron or is made thereof. The carrier typically comprises steel, aluminium, or grey iron or is made thereof.

The disk brake system may comprise another brake pad assembly having any or all of the features of the brake pad assembly described above or below. The brake pad assembly may be configured to be pushed on by the caliper finger, while the other brake pad assembly may be configured to be pushed on by the brake piston. The brake pad assembly and the other brake pad assembly may differ in size/or shape, according to some embodiments.

Exemplary embodiments will be described in conjunction with the following figures.

Figure 2:
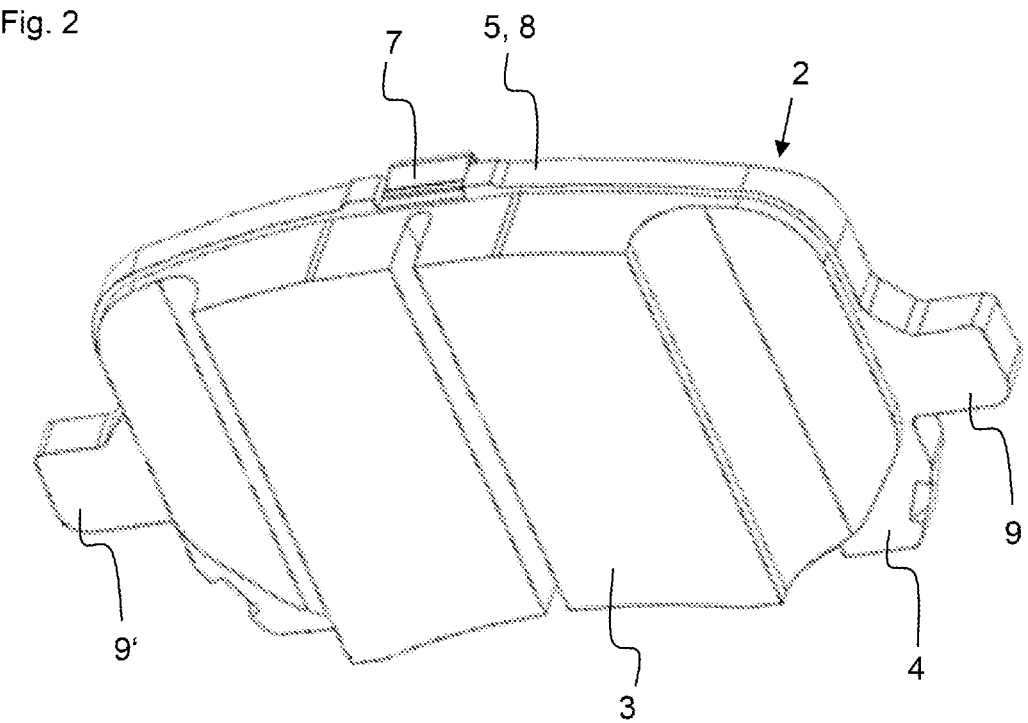
Figure 3:
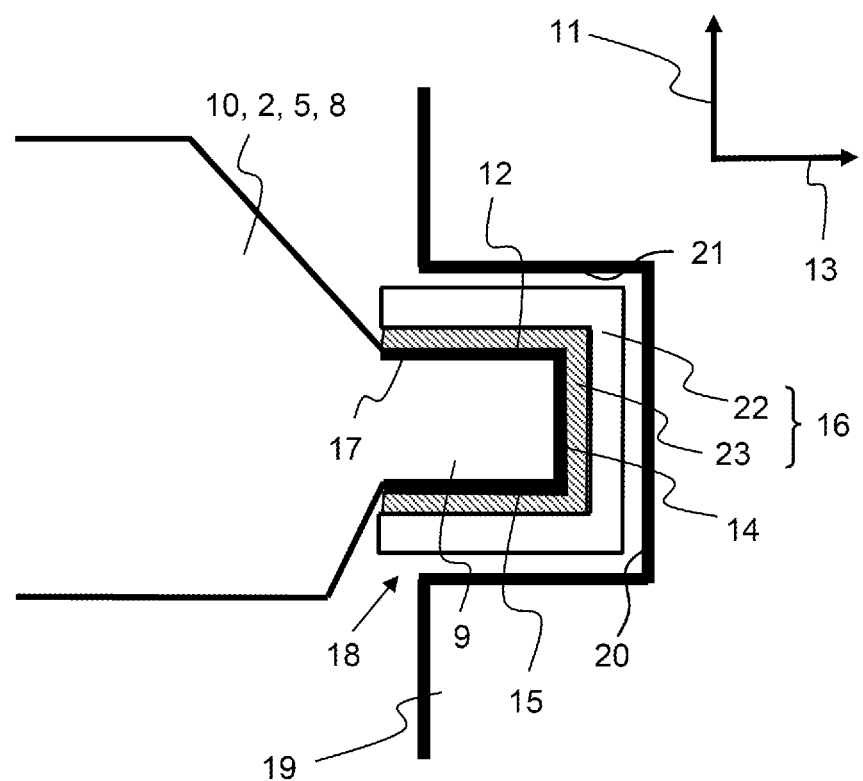
Figure 4:
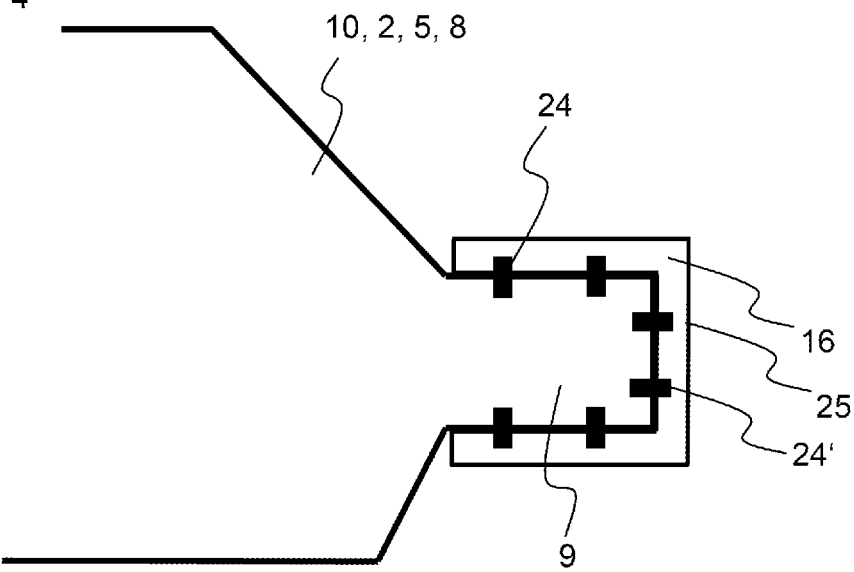
Figure 5:
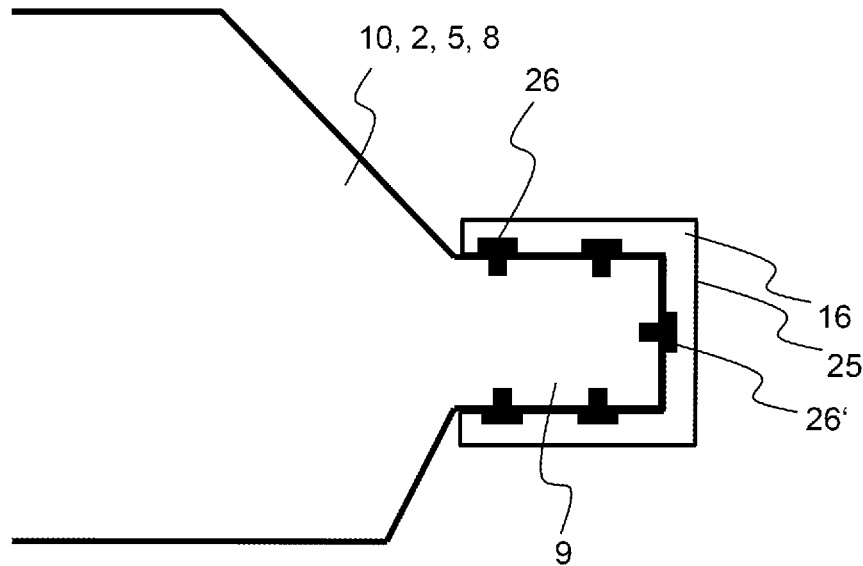
Figure 6:
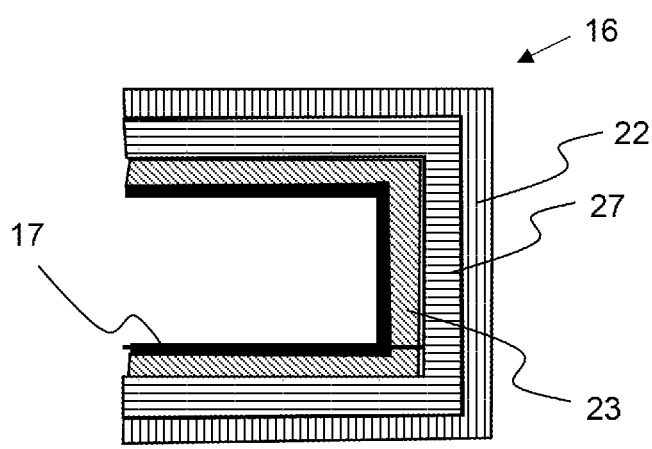

FIG. 1 shows a schematic cross sectional illustration of a brake pad and a brake disk, FIG. 2 shows a perspective view of a brake pad, FIG. 3 shows a schematic cross-sectional view of a brake pad assembly and a carrier, FIG. 4 shows a schematic cross-sectional view of a brake pad assembly according to another embodiment, FIG. 5 shows a schematic cross-sectional view of a brake pad assembly according to another embodiment, and FIG. 6 shows a schematic cross-sectional view of a shim of a brake pad assembly according to another embodiment.

FIG. 1 shows a brake disk 1 of a of a disk brake system for a vehicle. The disk brake system comprises a caliper housing, a caliper finger and a brake piston. The disk brake system further comprises a brake pad assembly having a brake pad 2, which may be attached relative to the caliper finger or to the brake piston such that upon application of the brake the caliper finger or the brake piston pushes the brake pad 2 in an axial direction toward the brake disk 1. The brake pad 2 has a friction layer 3, which is pushed against a friction surface of the brake disk 1 upon actuation of the disk brake system, e.g., hydraulic or electric actuation. The friction layer 3 contains a material that shows a good stopping performance and heat transfer when engaging with the brake disk 1. The friction layer 3 is attached to a front side 4 of a back plate 5, which provides structural stability to the brake pad 2. The brake piston or the caliper finger is configured to push against a back side 6 of the back plate 5 to push the friction layer 3 against the brake disk 1. In most embodiments, the back plate 5 is made of a metal, in particular steel. A thickness of the back plate 5 may be, e.g., 5 mm. The friction layer 3 can have a thickness of at least 8 mm and/or at most 15 mm, for example. The material of the friction layer 3 can for instance comprise at least one of copper, iron sulphide, graphite, zinc powder, basalt, calcium carbonate, tin sulphide, zinc aluminium, phenolic resin, rubber dust and mineral fibre. These materials show good stopping performance and heat transfer when engaging with the brake disk.

FIG. 2 shows a perspective view of the brake pad 2. Corresponding and reoccurring features shown in the different figures are denoted using the same reference numerals. The friction layer 3 of the brake pad 2 is fixed to the front side 4 of the back plate 5. A clip-on-shim 7 is attached to the back side 6 of the back plate 5 for noise dampening. The back plate 5 comprises a back plate body 8 forming the main portion of the back plate 5 and carrying the friction layer 3. The back plate 5 further comprises a pair of guiding protrusions 9, 9' formed at the two tangential sides of the back plate 5 and each configured to be received within a respective guiding recess of a carrier of the disk brake system. In the embodiment shown, the back plate body 5 and the guiding protrusions 9, 9' are formed as a one-piece, non-joined part.

FIG. 3 shows a cross-sectional view of the brake pad assembly 10 comprising the brake pad 2. The guiding protrusion 9 is delimited in a positive radial direction 11 by a top surface 12, in a tangential direction 13 by a side surface 14 and in a negative radial direction by a bottom surface 15. The brake bad assembly 10 further comprises a shim 16. The shim 16 has a C-shape and is formed by bending a ribbon-shaped layered structure such that it covers the top surface 12, the side surface 14 and the bottom surface 15 of the guiding protrusion 9 of the back plate 5. The shim 16 is glued to the top surface 12, the side surface 14 and the bottom surface 15 of the guiding protrusion 9 of the back plate 5 by an adhesive layer 17 to firmly connect the shim 16 with the back plate 5 such that the shim 16 lies flat against the top surface 12, the side surface 14 and the bottom surface 15 of the guiding protrusion 9 of the back plate 5. The adhesive layer 17 may have a thickness of, e.g., 0.08 mm.

The guiding protrusion 9 of the back plate 5 of the brake pad 2 is slidably received within a guiding recess 18 of the carrier 19 of the disk brake system. The guiding recess 18 of the carrier 19 defines guiding surfaces facing the guiding protrusion 9 of the back plate 5. One of the guiding surfaces of the carrier 19 is marked using reference numeral 20 in the figure, another guiding surface is marked using reference numeral 21. The shim 16 comprises a stiff layer 22, which may be a metal layer, e.g., a steel layer with a uniform thickness of 0.25 mm, or a hard plastic layer, which may have a thickness of, e.g., 0.6 mm, according to different embodiments. The shim 16 further comprises a rubber layer 23 in direct contact with the stiff layer 22. The rubber layer 23 may have a uniform thickness of, e.g., 0.2 mm or 0.25 mm. The shim 16 and its arrangement on the guiding protrusion 9 of the back plate 5 improve brake torque transmission at interface areas between components, reduce relative motion between contacting parts, and enable vibrational mode decoupling, leading to a reduction of squeal and clicking noise.

FIG. 4 shows a cross-sectional view of the brake pad assembly 10 according to another embodiment. The brake pad assembly 10 corresponds to the brake pad assemblies 10 discussed above, except that the shim 16 is attached to the guiding protrusion 9 of the back plate 5 using multiple rivets. The brake pad assembly can have an additional adhesive layer 17 as described above. Six rivets are shown in the figure, two of which are marked using reference numerals 24 and 24'. The rivets 24, 24' are received within bores within the surfaces 12, 14, 15 of the guiding protrusion 9 of the back plate 5, and are configured to attach the shim 16 to brake pad 2. The rivets 24, 24' are recessed with respect to an outer surface 25 of the shim 16. In this way, the rivets 24, 24' do not extend all the way toward the outer surface 25 of the shim 16. Depending on the embodiment, the outer surface 25 of the shim 16 may be formed by an outer surface of the stiff layer 22, an outer surface of an another rubber layer covering the stiff layer (not shown), if provided, or an outer surface of an additional PTFE layer (not shown), if provided.

FIG. 5 shows a cross-sectional view of the brake pad assembly 10 according to another embodiment. The brake pad assembly 10 corresponds to the brake pad assemblies 10 discussed above, except that the shim 16 is attached to the guiding protrusion 9 of the back plate 5 using bolts. Five bolts are shown, two of which are marked using reference numerals 26 and 26'. As described above for the rivets 24, 24', the bolts are recessed with respect to the outer surface 25 of the shim.

FIG. 6 shows a cross-sectional view of a shim 16 of a brake pad assembly 10 according to another embodiment. As discussed above, the shim 16 is configured to be attached to the guiding protrusion 9 of the back plate 5 using the adhesive layer 17. Further, the shim 16 comprises the rubber layer 23. In the embodiment shown, the stiff layer 22 is formed by the metal layer. Further, the shim 16 comprises a hard plastic sheet 27 arranged between the metal layer 22 and the rubber layer 23 to further improve the noise dampening properties. The shim 16 can have any or all of the features of the shims 16 according to the other embodiments described above.

Features of the different embodiments which are merely disclosed in the exemplary embodiments may be combined with one another and may also be claimed individually.

LIST OF REFERENCE NUMERALS

1 Brake disk
2 Brake pad
3 Friction layer
4 Front side of back plate
5 Back plate
6 Back side of back plate
7 Clip-on-shim
8 Back plate body
9, 9' Guiding protrusions
10 Brake pad assembly
11 Positive radial direction
12 Top surface
13 Tangential direction
14 Side surface
15 Bottom surface
16 Shim
17 Adhesive layer
18 Guiding recess
19 Carrier
20, 21 Guiding surfaces
22 Stiff layer
23 Rubber layer
24, 24' Rivets
25 Outer surface of shim
26, 26' Bolts
27 Hard plastic sheet

The invention claimed is:

1. A brake pad assembly for a disk brake system, comprising
a back plate having a front side for facing a brake disk of the disk brake system and
a friction layer arranged on the front side of the back plate for contacting a friction surface of the brake disk,
wherein the back plate comprises a guiding protrusion configured to be slidably received within a guiding recess of a carrier of the disk brake system,
characterized by a shim configured to be arranged between the guiding protrusion (9) of the back plate and the guiding recess of the carrier, wherein the shim comprises a rubber layer and a stiff layer, characterized in that the stiff layer is a hard plastic sheet.

2. The brake pad assembly of claim 1, characterized in that the rubber layer is arranged between the stiff layer and the guiding protrusion of the back plate.

3. The brake pad assembly of claim 1, characterized in that a thickness of the rubber layer is at least 0.1 mm and at most 0.4 mm.

4. The brake pad assembly of claim 1, characterized in that the shim is attached to a surface of the guiding protrusion of the back plate, wherein the surface of the guiding protrusion of the back plate is a side surface, a top surface or a bottom surface of the guiding protrusion of the back plate.

5. The brake pad assembly of claim 1, characterized in that the shim is attached to the guiding protrusion of the back plate using an adhesive layer.

6. The brake pad assembly of claim 1, characterized in that the shim comprises another rubber layer covering an outer surface of the stiff layer.

7. The brake pad assembly of claim 1, characterized in that the shim comprises a non-stick coating layer forming an outer surface of the shim.

8. The brake pad assembly of claim 1, characterized in that the shim is attached to the guiding protrusion of the back plate using bolts and/or rivets.

9. The brake pad assembly of claim 8, characterized in that the bolts or rivets are recessed with respect to an outer surface of the shim.

10. The brake pad assembly of claim 1, characterized in that the shim has a C-shape covering a side surface, a top surface and a bottom surface of the guiding protrusion of the back plate.

11. A disk brake system comprising a brake pad assembly according to claim 1 and further comprising the carrier, wherein the brake pad assembly is configured to slide with respect to the carrier in an axial direction upon brake application.

12. A brake pad assembly for a disk brake system, comprising
- a back plate having a front side for facing a brake disk of the disk brake system and
- a friction layer arranged on the front side of the back plate for contacting a friction surface of the brake disk,
- wherein the back plate comprises a guiding protrusion configured to be slidably received within a guiding recess of a carrier of the disk brake system,
- characterized by a shim configured to be arranged between the guiding protrusion (9) of the back plate and the guiding recess of the carrier, wherein the shim comprises a rubber layer and a stiff layer, characterized in that the stiff layer is a metal sheet, wherein the shim further comprises a hard plastic sheet.

13. The brake pad assembly of claim 12, characterized in that the metal sheet covers an outer surface of the hard plastic sheet.

* * * * *